US005600952A

United States Patent [19]

Aquino et al.

[11] Patent Number: 5,600,952

[45] Date of Patent: Feb. 11, 1997

[54] AUXILLIARY DRIVE APPARATUS

[75] Inventors: Giovanni Aquino, Kenmore; Ewan Choroszylow, East Aurora, both of N.Y.

[73] Assignee: Aurora Technology Corporation, East Aurora, N.Y.

[21] Appl. No.: 533,684

[22] Filed: Sep. 26, 1995

[51] Int. Cl.[6] .................................................. F16D 31/02

[52] U.S. Cl. ................................ 60/421; 60/428; 60/484

[58] Field of Search ............................ 60/484, 421, 422, 60/428, 486

[56] References Cited

U.S. PATENT DOCUMENTS

| | | | |
|---|---|---|---|
| 3,499,286 | 3/1970 | Reischl | 60/421 |
| 3,910,044 | 10/1975 | Symmank | 60/486 X |
| 4,405,287 | 9/1983 | Kuchenbecker et al. | 60/486 X |
| 4,516,467 | 5/1985 | Keeney et al. | 60/486 X |
| 4,953,584 | 9/1990 | Vegso | 137/218 |
| 5,163,465 | 11/1992 | King, Sr. | 137/218 |
| 5,386,873 | 2/1995 | Harden, III et al. | 165/47 |

FOREIGN PATENT DOCUMENTS

| | | | |
|---|---|---|---|
| 0147902 | 11/1981 | Japan | 60/486 |

*Primary Examiner*—Hoang Nguyen
*Attorney, Agent, or Firm*—Howard J. Greenwald

[57] ABSTRACT

An auxiliary drive apparatus which comprises an engine, a first hydraulic pump driven by the engine, a second hydraulic pump driven by the engine and integrally connected to the first hydraulic pump, a third hydraulic pump driven by the engine and integrally connected to the second hydraulic pump, a first pressure limiting valve connected in parallel to the first hydraulic pump, a first vacuum breaking valve connected in parallel to the first hydraulic pump, a first hydraulic motor connected in series to the first hydraulic pump, a second pressure limiting valve connected in parallel to the second hydraulic pump, a second vacuum breaking valve connected in parallel to the second hydraulic pump, a second hydraulic motor connected in series to the second hydraulic pump, a third pressure limiting valve connected in parallel to the third hydraulic pump, a third vacuum breaking valve connected in parallel to the third hydraulic pump, and a third hydraulic motor connected in series to the third hydraulic pump.

20 Claims, 6 Drawing Sheets

AUXILLIARY DRIVE APPARATUS

FIELD OF THE INVENTION

An apparatus for supplying mechanical power to a variety of different devices such as blowers, fans, generators, and pumps.

BACKGROUND OF THE INVENTION

Compressed natural gas refueling stations are known. See, for example, U.S. Pat. No. 5,351,726, the disclosure of which is hereby incorporated by reference into this specification.

These compressed natural gas refueling stations generally require auxiliary systems, such as fans, pumps, generators, and the like. These auxiliary systems are typically powered by either separate electric motors and/or by power takeoff devices connected to the engine or compressor of the refueling station.

One of primary advantages of natural gas refueling stations powered by an engine is that electric power (which often is expensive and/or unavailable) is not required. This very real advantage is mitigated when the auxiliary systems of the natural gas refueling station require electricity.

Consequently, many of the natural gas refueling stations powered by an engine have their auxiliary systems powered directly by such engines, often being directly connected to the shafts of such engines or to the shafts of the coupled compressors. However, because of the design constraints of such an arrangement, it is generally more costly, complicated, and space-consuming to utilize such a design.

It is an object of this invention to provide a drive system for the auxiliary devices of a compressed natural gas refueling system which is hydraulically driven by the engine of such refueling system.

It is another object of this invention to provide a novel compressed natural gas refueling system which is substantially smaller, less complicated, more efficiently packaged, and less expensive than conventional compressed natural gas refueling systems.

SUMMARY OF THE INVENTION

In accordance with this invention, there is provided an auxiliary drive apparatus which comprises an engine, a first hydraulic pump driven by the engine, a second hydraulic pump driven by the engine and integrally connected to the first hydraulic pump, a third hydraulic pump driven by the engine and integrally connected to the second hydraulic pump, a first pressure limiting valve connected in parallel to the first hydraulic pump, a first vacuum breaking valve connected in parallel to the first hydraulic pump, a first hydraulic motor connected in series to the first hydraulic pump, a second pressure limiting valve connected in parallel to the second hydraulic pump, a second vacuum breaking valve connected in parallel to the second hydraulic pump, a second hydraulic motor connected in series to the second hydraulic pump, a third pressure limiting valve connected in parallel to the third hydraulic pump, a third vacuum breaking valve connected in parallel to the third hydraulic pump, and a third hydraulic motor connected in series to the third hydraulic pump.

DESCRIPTION OF THE PREFERRED EMBODIMENTS

Figure 1:
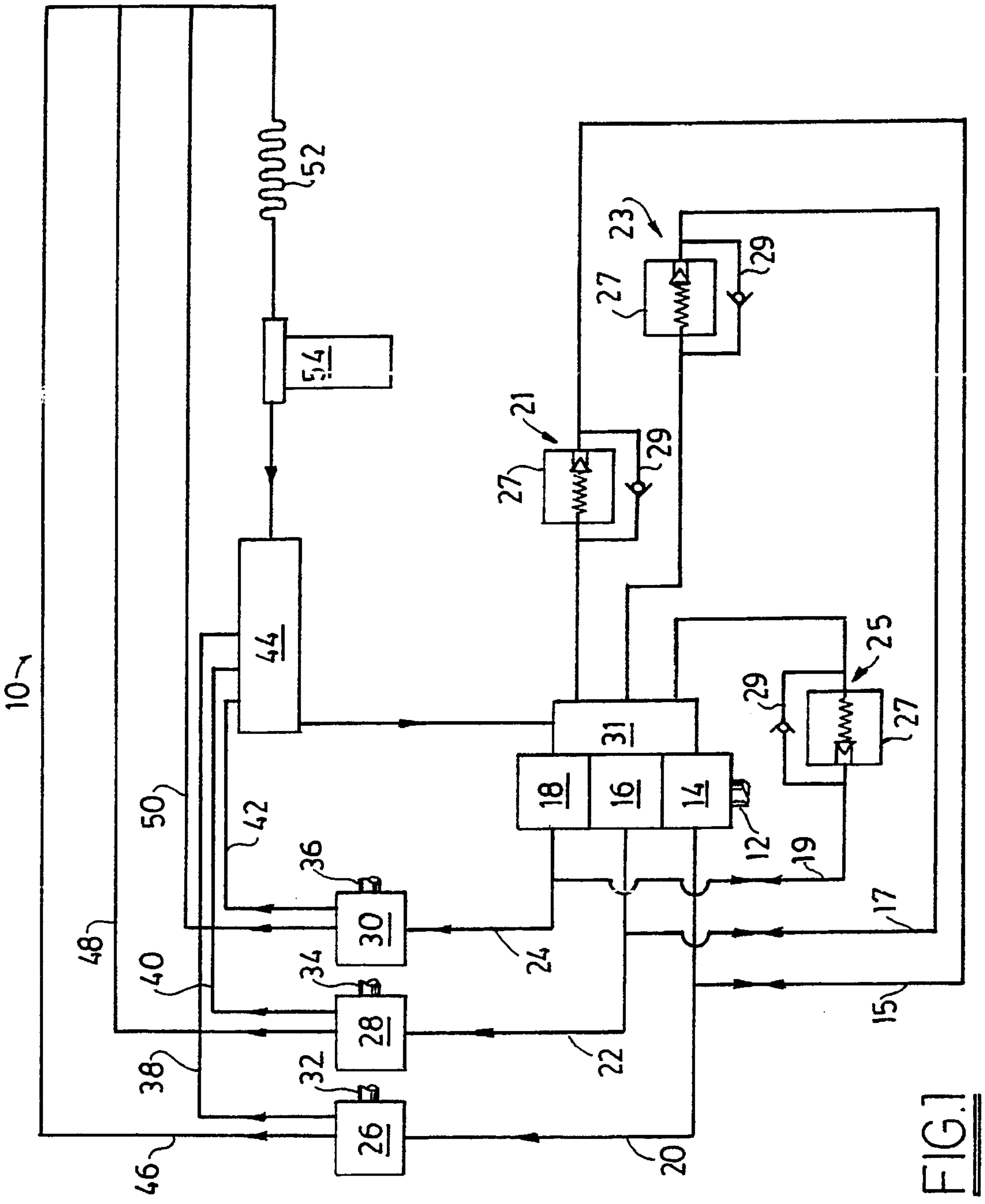
FIG. 1 is a schematic of one preferred embodiment of an auxiliary hydraulic drive system.

FIG. 1 is a schematic of one preferred embodiment of an auxiliary hydraulic drive system 10. Referring to FIG. 1, it will be seen that auxiliary hydraulic drive system 10 is comprised of a source of rotary power (not shown) connected to a rotatable shaft 12.

The source of rotary power is not necessarily part of this invention. Any conventional rotary power source may be used. Thus, by way of illustration and not limitation, one may use a reciprocating engine, a rotary engine, a turbine, a vane motor, and the like.

Thus, by way of illustration and not limitation, the source of rotary power (not shown) can be a six-cylinder natural gas driven reciprocating engine manufactured and sold by the Caterpillar Inc. of Mossville, Ill. as model number CAT 3106 NA. Other suitable sources of rotary power will be apparent to those skilled in the art.

Referring again to FIG. 1, it will be seen that shaft 12 is connected to pumps 14, 16, and 18.

In one embodiment, each of pumps 14, 16, and 18 is a constant output pump whose hydraulic output is linearly related to the speed of rotation of shaft 12.

In one embodiment, each of pumps 14, 16, and 18 is a gear pump. As is known to those skilled in the art, a gear pump is a rotary pump in which two meshing gear wheels engage so that fluid is entrained on one side and discharged on the other.

One may use the gear pumps known to those skilled in the art. Thus, by way of illustration and not limitation, one may use one or more of the gear pumps disclosed in U.S. Pat. Nos. 5,423,601, 5,421,702, 5,410,403, 5,395,519, 5,391,068, 5,388,974, and the like. The disclosure of each of these United States patents is hereby incorporated by reference into this specification.

As is known to those skilled in the art, gear pumps can be either external or internal gear types; see, e.g., pages A/158 et seq. of the "1992–1993 Fluid Power Handbook & Directory" (Preston Publishing, Cleveland, Ohio, 1992). Thus, for example, the spur gear pump illustrated on such page A/158 is suitable.

In one embodiment, illustrated in FIG. 1, pumps 14, 16, and 18 are integrally joined to each other to form a multiple pump with a single input shaft but multiple outputs. These type of multiple pumps are well known to those skilled in the art and are described, e.g., in U.S. Pat. No. 5,306,242 (multiple pump cassette), U.S. Pat. No. 5,037,283 (multiple vane pump), U.S. Pat. No. 4,992,031 (internal combustion engine driving a multiple pump), U.S. Pat. Nos. 3,987,707, 3,961,562, and the like. The disclosure of each of these United States patents is hereby incorporated by reference into this specification.

These type of multiple pumps are readily commercially available. Thus, e.g., and referring to page C23 of the aforementioned 1992–1993 "Fluid Power Handbook and Directory", the John S. Barnes Corporation (of 2222 15th Street, Rockford, Ill. 61125) manufactures and sells multiple pumps. The advertisement appearing on such page C/34 states that "Multiple pumps up to five sections are a strong segment of our product line,, and each series of John S. Barnes pumps is available in multiple configurations."

By way of further illustration, one may use a John S. Barnes multiple pump identified as "triple pump", part number G5-2D-10-10.

In one embodiment where each of pumps 14, 16, and 18 is a gear pump, at least one of such pumps has a different hydraulic output than at least one of the others of such pumps.

Referring again to FIG. 1, the outputs from pumps 14, 16, and 18 are passed via lines 20, 22, and 24 to hydraulic motors 26, 28, and 30. However, when the pressure of the output fluid from pumps 14 and/or 16 and/or 18 is too great, means are provided for diverting some of the fluid back into an inlet manifold.

Referring to FIG. 1, fluid from pumps 14, 16, and 18 is passed via lines 15, 17, and 19 to pressure relief assemblies 21, 23, and 25.

In the embodiment depicted in FIG. 1, each of pressure relief assemblies 21, 23, and 25 is comprised of a relief valve 27 connected in parallel with a vacuum breaker valve 29.

Fluid pressure relief valves are well known and are described in, e.g., U.S. Pat. Nos. 5,415,329, 5,411,056, 5,404,061, 5,398,723 (adjustable pressure relief valve), U.S. Pat. No. 5,396,923 (surge relief valve), U.S. Pat. Nos. 5,395,518, 5,390,696, 5,386,809, and the like. The disclosure of each of these United States patents is hereby incorporated by reference into this specification.

Vacuum breaker valves are also well known to those skilled in the art. Thus, e.g., one may use one or more of the vacuum breaker valves described in U.S. Pat. Nos. 5,330,652, 5,329,957, 5,320,328, 5,279,324 (vacuum breaker check valves), U.S. Pat. No. 5,234,017, 5,163,465 (vacuum breaker venting valves), U.S. Pat. Nos. 4,953,584, 4,696,321, 4,683,059, 4,646,779 (adjustable vacuum breaker fill valve), U.S. Pat. No. 4,574,826, and the like. The disclosure of each of these United States patents is hereby incorporated by reference into this specification.

Referring again to FIG. 1, it will be seen that relief assemblies 21, 23, and 25 operate in the manner described below. When the discharge fluid from pumps 14 and/or 16 and/or 18 exceeds a certain preset fluid pressure, the relief valve 27 opens and allows fluid to pass through line 15, 17, or 19 back to pump intake manifold 31, where the over-pressure fluid can then be redistributed to pumps 14, 16, and 18. Alternatively, when the discharge fluid from pumps 14 and/or 16 and/or 18 has a pressure which is less than the fluid pressure in manifold 31, then vacuum breaker valves 29 open and allow fluid to flow from manifold 31 directly to the discharge lines 20, 22, and 24.

As is known to those skilled in the art, a hydraulic motor is a motor activated by water or other liquid under pressure. They are preferably equipped with rotatable shafts (such as, e.g., rotatable shafts 32, 34, and 36), each of which can be operatively connected as the drive system for auxiliary units of a compressed natural gas refueling system. Thus, e.g., motors 26 and/or 28 and/or 30 may be used to drive fans, hydraulic pumps, generators, and the like.

These type of hydraulic motors are well known to those skilled in the art. Thus, e.g., reference may be had to U.S. Pat. Nos. 5,426,805, 5,421,156, 5,419,086, 5,419,132, 5,413,030, 5,412,947, 5,410,842, 5,409,344, 5,409,072, and the like. The disclosure of each of these United States patents is hereby incorporated by reference into this specification.

Thus, by way of further illustration, one may purchase suitable hydraulic motors from the aforementioned John S. Barnes Corporation of Rockford, Ill. (see page C/34 of said 1992–1992 "Fluid Power Handbook & Directory").

In the preferred embodiment illustrated in FIG. 1, each of motors 26, 28, and 30 is equipped with a vent line 38, 40, and 42 to transmit fluid which leaks from the motor's bearings to hydraulic fluid reservoir 44. However, a major amount of fluid discharged from hydraulic motors 26, 28, and 30 is piped through lines 46, 48, and 50 to a common cooler 52 and thence to filter 54 and then to reservoir 44.

It is preferred that common cooler 52 cool the fluid passing through it to a temperature of less than about 130 degrees Fahrenheit. Any of the fluid cooling devices known to those skilled in the art can be used as cooler 52. Thus, by way of illustration, one may use one or more of the oil coolers disclosed in U.S. Pat. Nos. 5,409,058, 5,408,965, 5,408,836, 5,401,149, 5,386,873, 5,373,892, 5,369,883, and the like. The disclosure of each of these United States patents is hereby incorporated by reference into this specification. Thus, by way of further illustration, but not limitation, one may use the AB Series of fixed tube bundle water cooled heat exchangers sold by the American Industrial Heat Transfer, Inc. of 5330 50th Street, Kenosha, Wis. 53144.

The cooled fluid from cooler 52 is passed to filter 54, which removes contaminants from the hydraulic fluid such as, e.g., metal shavings.

One may use the hydraulic filters known to those skilled in the art such as, e.g., the filters disclosed in U.S. Pat. Nos. 4,663,034, 4,126,553, 3,800,948, 3,501,005, and the like. The disclosure of each of these United States patents is hereby incorporated by reference into this specification.

By way of further illustration and not limitation, one may use one or more of the hydraulic filters sold in Catalog 2300 by the Parker Hannifin Corporation of 17325 Euclid Avenue, Cleveland, Ohio.

Referring again to FIG. 1, the filtered fluid from filter 54 is passed to reservoir 44.

Figure 2:
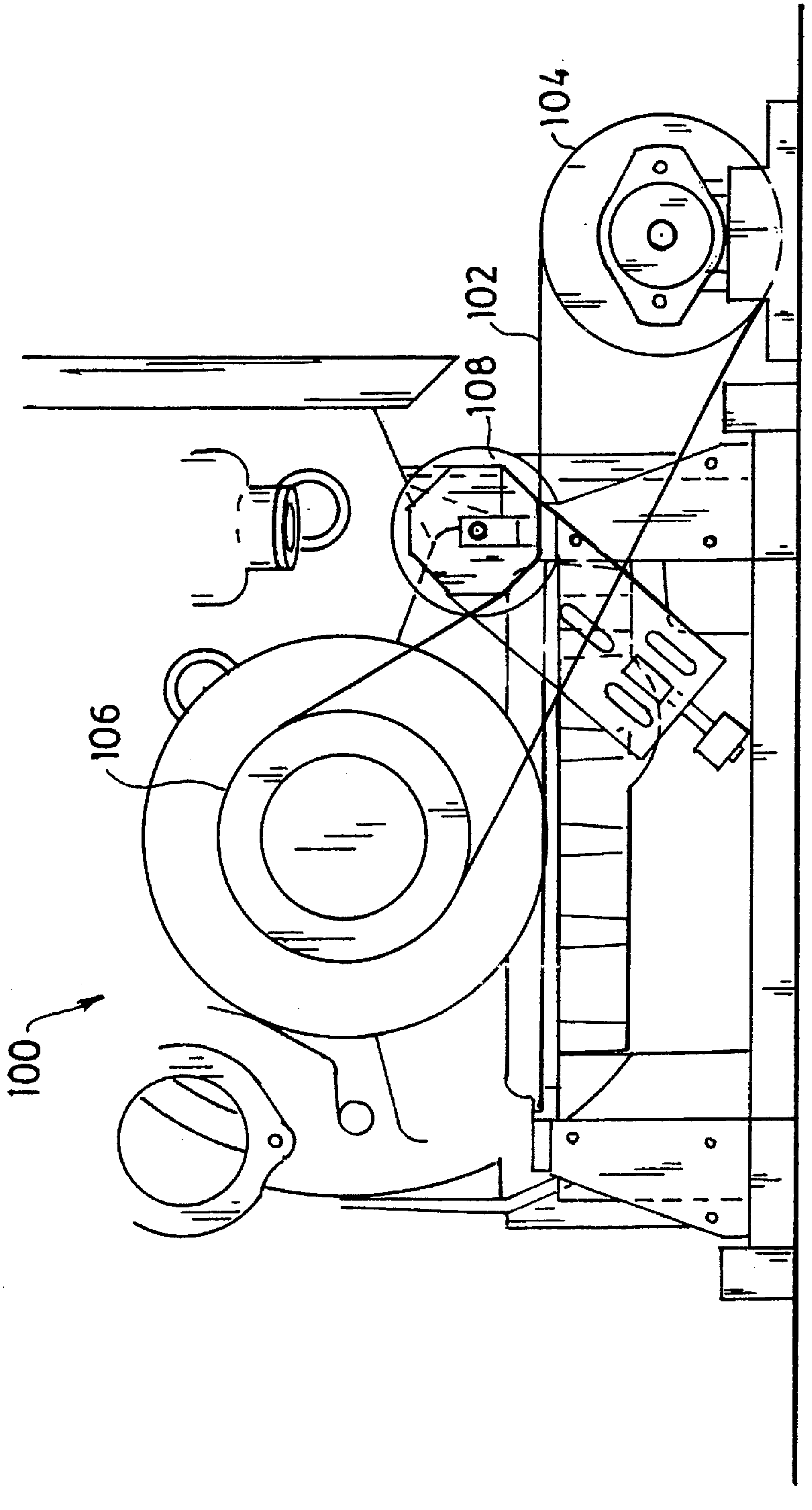
FIG. 2 is a partial schematic view of an natural gas driven engine providing motive power to pump through a belt drive.

FIG. 2 is frontal schematic view of the bottom half of a natural gas engine 100 operatively connected by a belt drive system 102 to pump pulley 104. In the embodiment depicted, pulley 104 is preferably the same size as pulley of engine 100. Furthermore, in this preferred embodiment, belt 102 engages belt tensioner 108.

Figure 3:
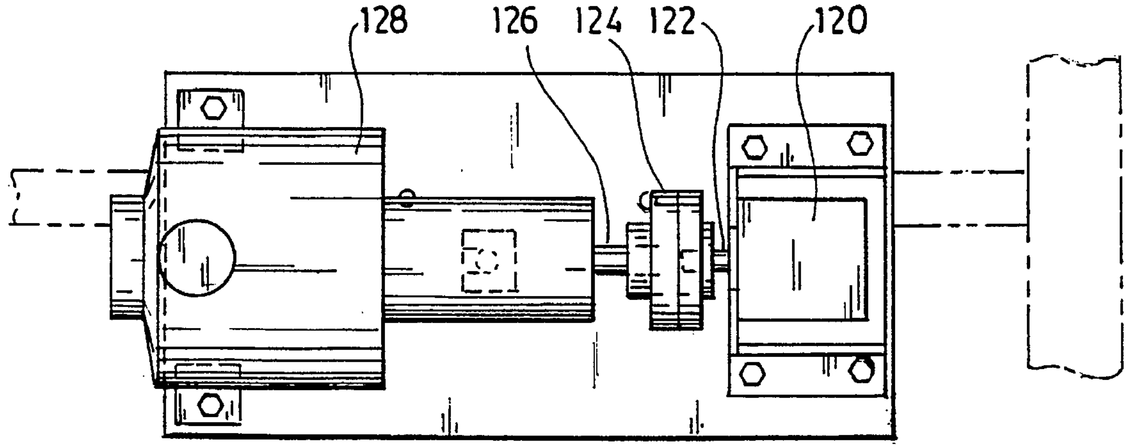
FIG. 3 is a top view of a hydraulic motor driving a water/glycol coolant pump.
Figure 4:
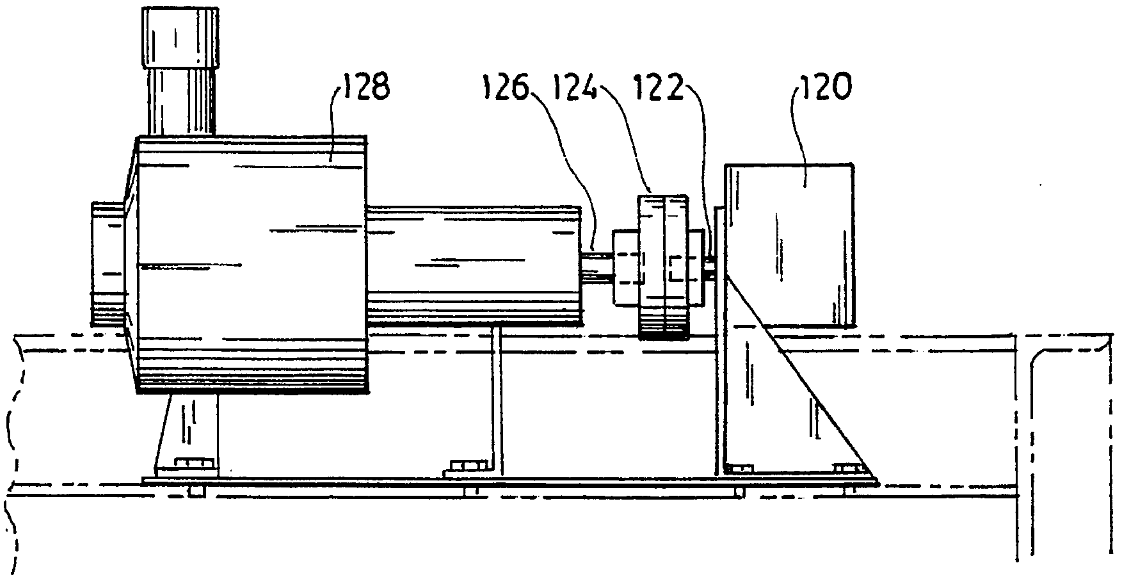
FIG. 4 is a side view of the assembly of FIG. 3.

FIG. 3 is a top view of a hydraulic motor 120 whose shaft 122 is connected to coupling 124, which in turn engages the drive shaft 126 of water/glycol coolant pump 128. FIG. 4 is a side view of the same assembly.

Figure 5:
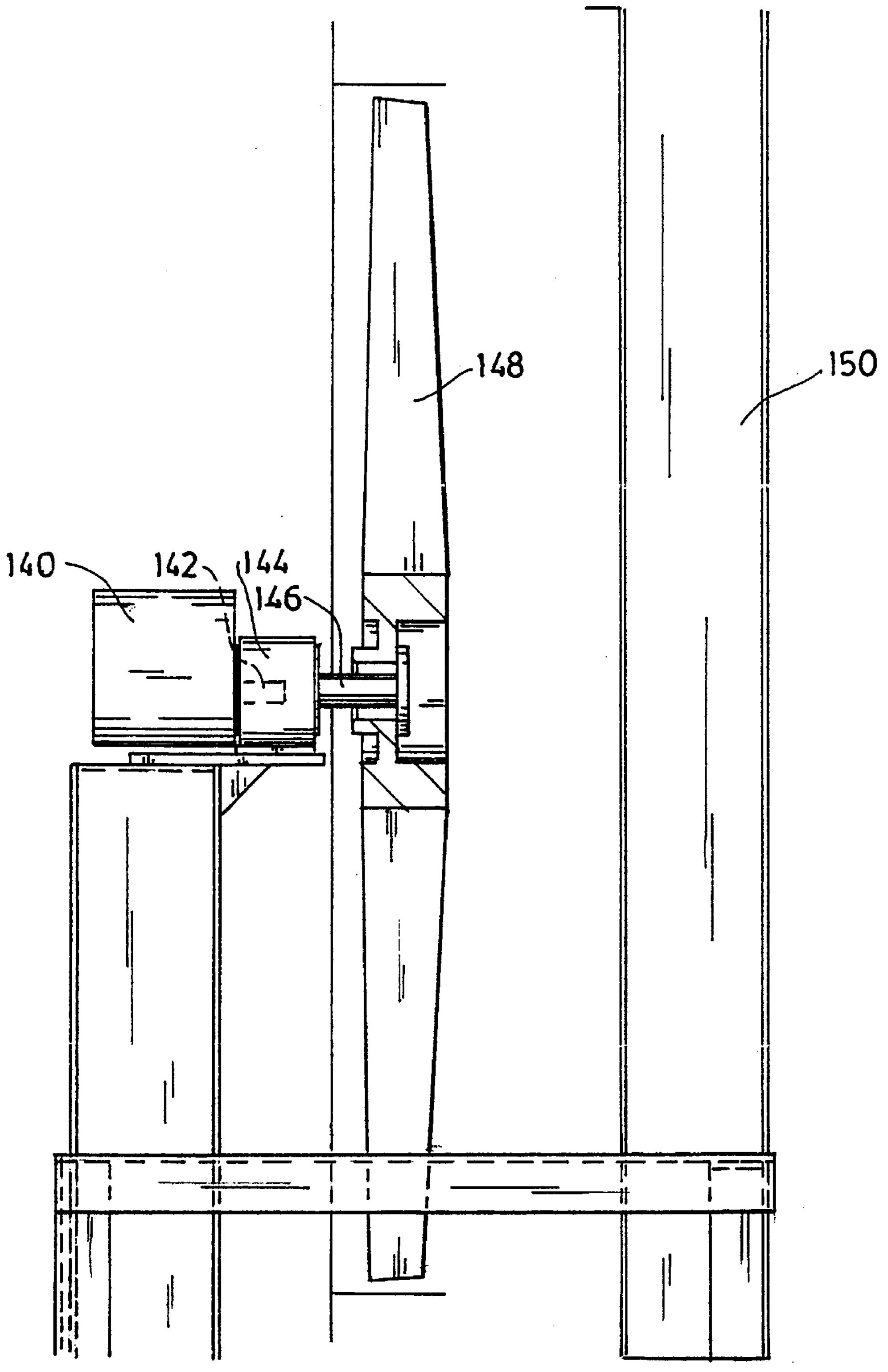
FIG. 5 is a side view of a hydraulic motor driving a fan directing air through a radiator comprised of a water/glycol coolant loop.

FIG. 5 is a side schematic view of hydraulic motor 140 whose shaft 142 is connected by coupling/pillow block 144 to the shaft 146 of fan 148. Air flow from fan 148 is directed through radiator 150, thereby cooling the water/glycol (not shown) in it.

Figure 6:
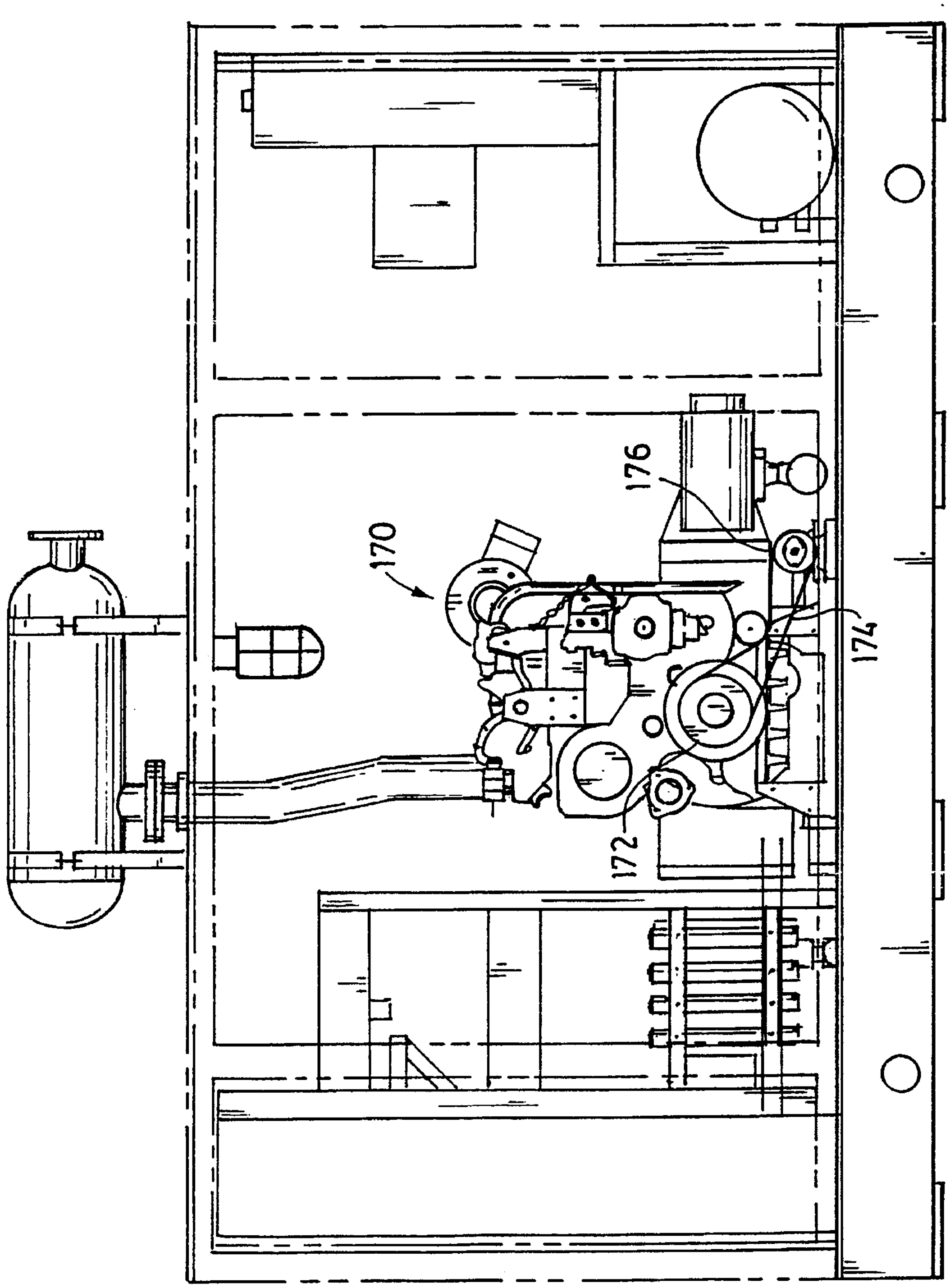
FIG. 6 is a sectional view of a compressed natural gas compressor module.

FIG. 6 is a side schematic view of a compressed natural gas refueling compressor module. Referring to FIG. 6, it will be seen that a Caterpillar 3306 NA natural gas driven engine 170 rotates pulley 172 which, in turn, by a belt drive connection 174, drives pump assembly 176.

Figure 7:
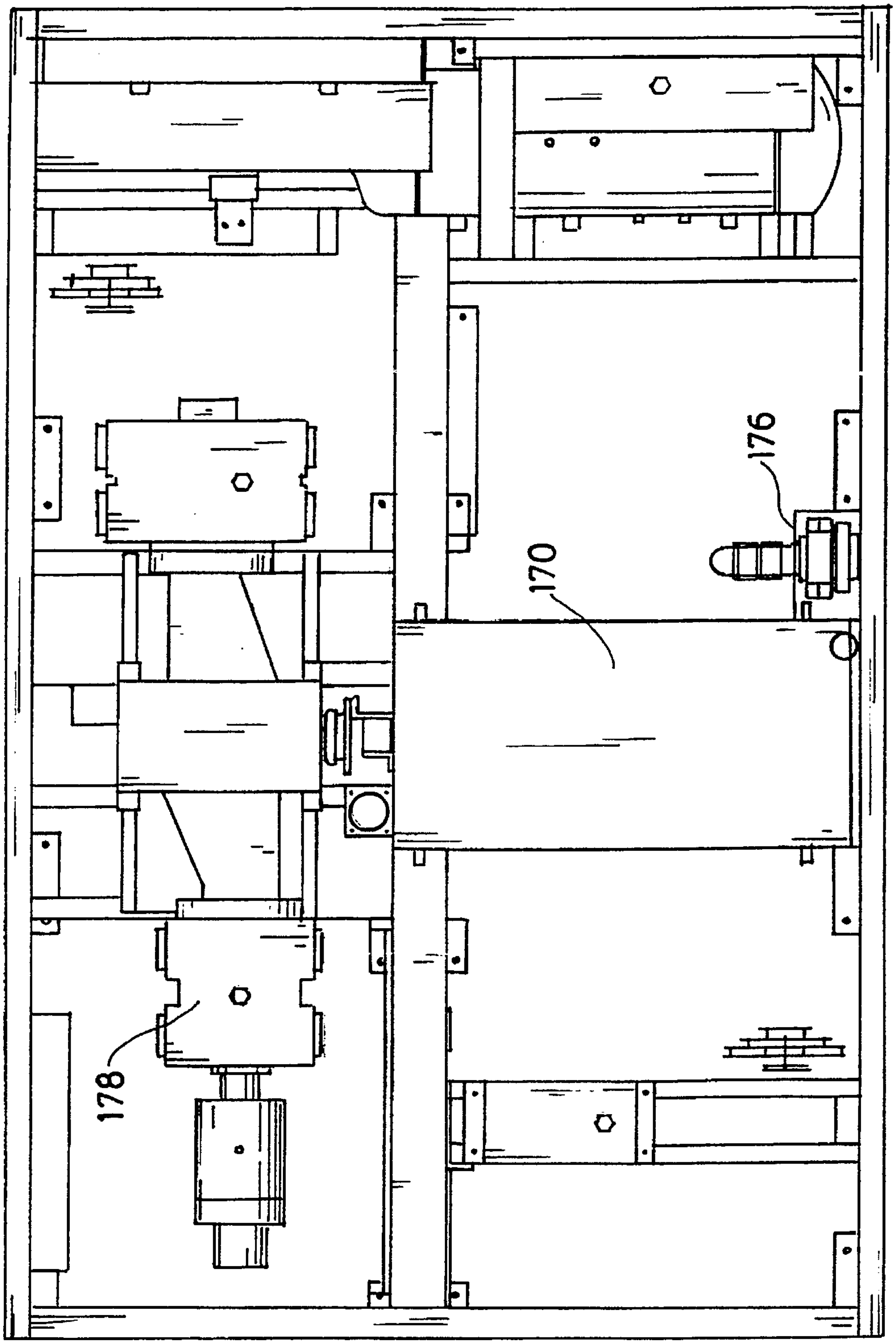
FIG. 7 is a top view of the assembly of FIG. 6.

FIG. 7 is a top view of the assembly of FIG. 6. Referring to FIG. 7, it will be seen that engine 170 drives stacked pump assembly 176. It will be appreciated that engine 170 is connected to compressor 178, which is the main source of compressed natural gas.

In one preferred embodiment, the compressor used in conjunction with applicants auxiliary drive system is described in U.S. Pat. No. 5,431,551, the entire disclosure of which is hereby incorporated by reference into this specification.

Thus, the preferred compressor may be a rotary device comprised of a housing comprising a curved inner surface with a profile equidistant from a trochoidal curve, an eccentric mounted on a shaft disposed within said housing, a first rotor mounted on said eccentric shaft which is comprised of a first side, a second side, and a third side, a first partial bore disposed at the intersection of said first side and said second side, a second partial bore disposed at the intersection of said second side and said third side, a third partial bore disposed at the intersection of said third side and said first side, a first solid roller disposed and rotatably mounted within said first partial bore, a second solid roller disposed and rotatably mounted within said second partial bore, and a third solid roller disposed and rotatably mounted within said third partial bore.

In this preferred compressor, the said rotor is comprised of a front face, a back face, said first side, said second side, and said third side, wherein (1) a first opening is formed between and communicates between said front face and said first side, (2) a second opening is formed between and communicates between said back face and said first side, wherein each of said first opening and said second opening is substantially equidistant and symmetrical between said first partial bore and said second partial bore, (3) a third opening is formed between and communicates between said front face and said second side, (4) a fourth opening is formed between and communicates between said back face and said second side, wherein each of said third opening and said fourth opening is substantially equidistant and symmetrical between said second partial bore and said third partial bore, (5) a fifth opening is formed between and communicates between said front face and said third side, and (6) a sixth opening is formed between and communicates between said back face and said third side, wherein each of said fifth opening and said sixth opening is substantially and equidistant and symmetrical between said third partial bore and said first partial bore.

In this preferred embodiment, each of said first partial bore, said second partial bore, and said third partial bore is comprised of a centerpoint which, as said rotary device rotates, moves along said trochoidal curve. Furthermore, each of each of said first opening, said second opening, said third opening, said fourth opening, said fifth opening, and said sixth opening has a substantially U-shaped cross-sectional shape defined by a first linear side, a second linear side, and an arcuate section joining said first linear side and said second linear side.

Also, in this preferred embodiment, said first linear side and said second linear side are disposed with respect to each other at an angle of less than ninety degrees, and said substantially U-shaped cross sectional shape has a depth which is at least equal to its width.

In the preferred embodiment, the diameter of said first solid roller is equal to the diameter of said second solid roller, and the diameter of said second solid roller is equal to the diameter of said third solid roller. Furthermore, in this device, the widths of each of said first opening, said second opening, said third opening, said fourth opening, said fifth opening, and said sixth opening are substantially the same, and the width of each of said openings is less than the diameter of said first solid roller. Also, in this device, each of said first side, said second side, and said third side has substantially the same geometry and size and is a composite shape comprised of a first section and a second section, wherein said first section has a shape which is different from said second section.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An auxiliary drive apparatus which comprises an engine, a first hydraulic pump driven by said engine comprising a first pump inlet and a first pump outlet, a second hydraulic pump driven by said engine comprising a second pump inlet and a second pump outlet, a third hydraulic pump driven by said engine comprising a third pump inlet and a third pump outlet, a first pressure relief valve connected in parallel to said first pump outlet of said first hydraulic pump, a first vacuum breaking valve connected in parallel to said first pump outlet of said first hydraulic pump, a first hydraulic motor connected in series to said first pump outlet of said first hydraulic pump,, a second pressure relief valve connected in parallel to said second pump outlet of said second hydraulic pump, a second vacuum breaking valve connected in parallel to said second pump outlet of said second hydraulic pump, a second hydraulic motor connected in series to said second pump outlet of said second hydraulic pump, a third pressure relief valve connected in parallel to said third pump outlet of said third hydraulic pump, a third vacuum breaking valve connected in parallel to said third pump outlet of said third hydraulic pump, and a third hydraulic motor connected in series to said third pump outlet of said third hydraulic pump wherein:

(a) said first pressure relief valve diverts fluid directly to said first pump inlet of said first hydraulic pump when the fluid discharged from said first pump outlet of said first hydraulic pump exceeds a specified limit, (b) said second pressure relief valve diverts fluid directly to said second pump inlet of said second hydraulic pump when the fluid discharged from said second pump outlet of said second hydraulic pump exceeds a specified limit, (c) said third pressure relief valve diverts fluid directly to said third pump inlet of said third hydraulic pump when the fluid discharged from said third pump outlet of said third hydraulic pump exceeds a specified limit, (d) said auxiliary drive apparatus is comprised of means for isolating a first fluid discharged from said first pump outlet of said first hydraulic pump and feeding only said first fluid to said first hydraulic motor, (e) said auxiliary drive apparatus is comprised of means for isolating a second fluid discharged from said second pump outlet of said second hydraulic pump and feeding only said second fluid to said second hydraulic motor, and (f) said auxiliary drive apparatus is comprised of means for isolating a third fluid discharged from said third pump outlet of said third hydraulic pump and feeding only said third fluid to said third hydraulic motor.

2. The apparatus as recited in claim 1, wherein said engine is a reciprocating engine.

3. The apparatus as recited in claim 1, wherein each of said first pump, said second pump, and said third pump is a constant output pump.

4. The apparatus as recited in claim 1, wherein each of said first pump, said second pump, and said third pump is a gear pump.

5. The apparatus as recited in claim 4, wherein said gear pump is an external gear pump.

6. The apparatus as recited in claim 1, wherein each of said first pump, said second pump, and said third pump are joined to each other to form a multiple pump.

7. The apparatus as recited in claim 6, wherein said multiple pump comprises three gear pumps.

8. The apparatus as recited in claim 1, wherein said apparatus is comprised of a means for cooling hydraulic fluid.

9. The apparatus as recited in claim 1, wherein said apparatus is comprised of an oil filter.

10. The apparatus as recited in claim 6, wherein said engine is connected to said multiple pump by means of a belt drive system.

11. The apparatus as recited in claim 1, wherein said engine is connected to a compressor.

12. The apparatus as recited in claim 2, wherein each of said first pump, said second pump, and said third pump is a constant output pump.

13. The apparatus as recited in claim 12, wherein each of said first pump, said second pump, and said third pump is a gear pump.

14. The apparatus as recited in claim 13, wherein said gear pump is an external gear pump.

15. The apparatus as recited in claim 14, wherein each of said first pump, said second pump, and said third pump are joined to each other to form a multiple pump.

16. The apparatus as recited in claim 15, wherein said multiple pump comprises three gear pumps.

17. The apparatus as recited in claim 16, wherein said apparatus is comprised of a means for cooling hydraulic fluid.

18. The apparatus as recited in claim 17, wherein said apparatus is comprised of an oil filter.

19. The apparatus as recited in claim 18, wherein said engine is connected to said multiple pump by means of a belt drive system.

20. The apparatus as recited in claim 19, wherein said engine is connected to a compressor.

* * * * *